March 7, 1933.  E. G. BAILEY  1,900,007
FURNACE BLOCK
Filed July 30, 1927  2 Sheets-Sheet 1
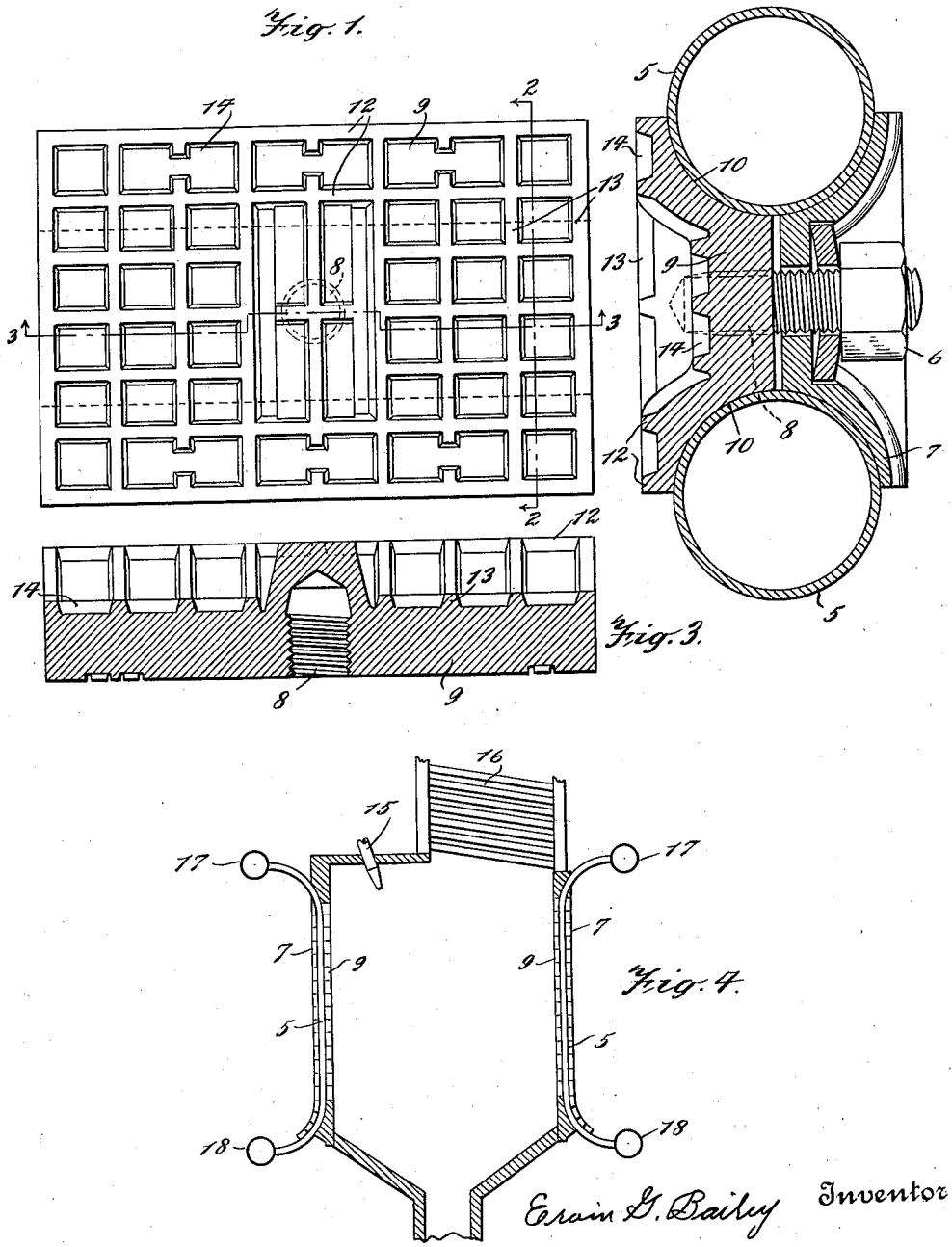

March 7, 1933.  E. G. BAILEY  1,900,007
FURNACE BLOCK
Filed July 30, 1927   2 Sheets-Sheet 2
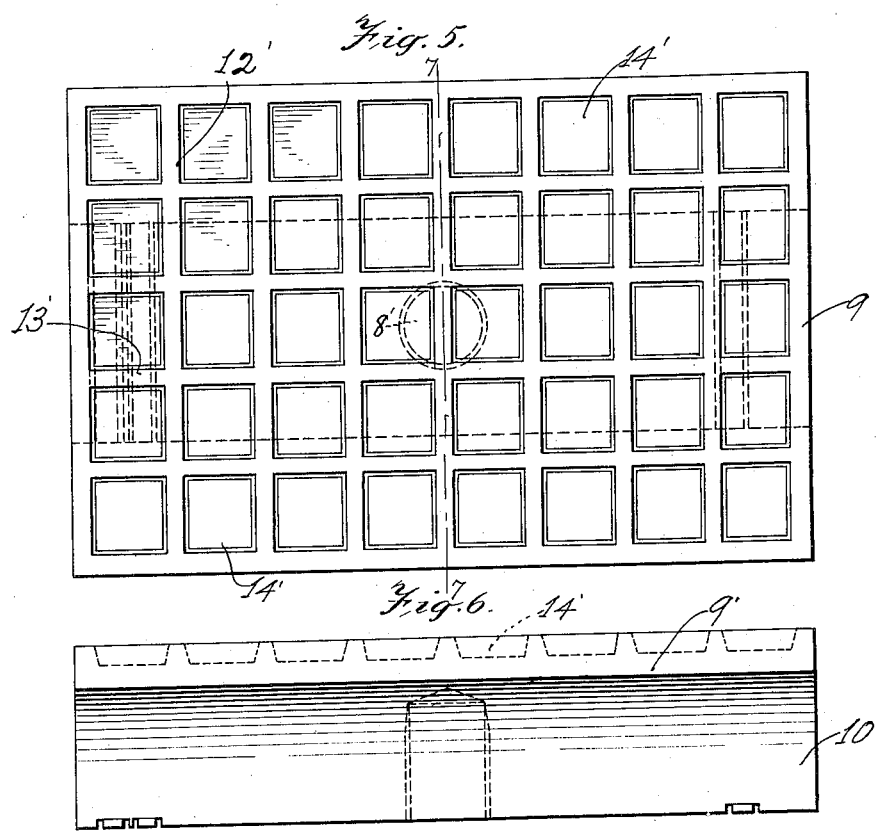
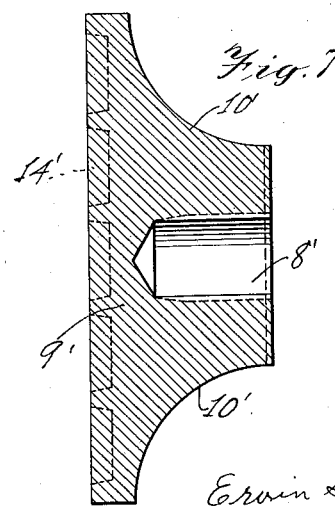
Erwin G. Bailey Inventor
By his Attorneys
Gifford & Scull Patented Mar. 7, 1933

1,900,007

UNITED STATES PATENT OFFICE

ERVIN G. BATTEY, OF EASTON, PENNSYLVANIA, ASSIGNOR TO FULLER LEHIGH COMPANY, OF FULLERTON, PENNSYLVANIA, A CORPORATION OF DELAWARE

FURNACE BLOCK

Application filed July 30, 1927. Serial No. 209,583.

This invention relates to a method by which slag from fuel burned in a furnace may be caused to deposit upon and adhere to surfaces in the furnace and also to metal blocks or tile, with which walls or surfaces may be made for the slag to deposit upon and adhere to.

It has been found in furnaces for boilers, for example, in which powdered coal is burned, that when the walls are made of refractory material the slag from the fuel quickly destroys the wall by impinging against the same or by chemical reaction, especially when the slag is in a molten condition when it strikes the wall. Attempts have heretofore been made to overcome this difficulty by keeping the walls sufficiently cool to cause the slag to congeal and stick to the wall by installing water tubes in the wall. This is not satisfactory unless good heat conducting surfaces are maintained between the tubes and the tile that constitute the walls. In order to secure satisfactory heat conductivity between the tile and the tubes, the tile are made in the form of composite tile, having a back metal portion. Such tile are very expensive to make.

By the present invention, bare metal blocks are provided so that effective heat conducting surfaces are maintained between the blocks and the tubes and the surfaces of the blocks, which slag strikes, are made of such character that the slag will adhere tenaciously thereto. Due to the fact that the metal blocks are kept quite cool by the rapid transmission of heat to the water tubes, the bare blocks will always be cool enough to cause the slag to congeal when it strikes the same, and the slag will gradually build up until a sufficiently thick layer of the slag exists on the surfaces of the blocks to decrease the rate of heat transmission to a point so that the inside surface of the layer of slag will reach a temperature sufficiently high to prevent more slag from congealing and adhering thereto. Thus, the thickness of the layer of slag on the faces of the metal blocks automatically assumes such a value that the inside surfaces of the walls are kept at the proper temperature. This temperature is such that combustion inside of the furnace is not interfered with because of the inside of the walls being too cool and at the same time the layer of slag in contact with the faces of the metal blocks is securely held by adhesion.

The invention will be understood from the description in connection with the accompanying drawings, in which Fig. 1 is a plan view of one of the metal blocks; Fig. 2 is a section along the line 2—2 of Fig. 1; Fig. 3 is a section along the line 3—3 of Fig. 1; Fig. 4 is a vertical section through a boiler furnace in which the invention may be used; Fig. 5 is a plan view similar to Fig. 1 showing a modification; Fig. 6 is an edge view of the modification; and Fig. 7 is a section along the line 7—7 of Fig. 5. In the drawings, reference character 5 indicates a row of water tubes that constitute a portion of the furnace walls. Stud bolts 6 passing through holes in saddles or clamps 7 hold the metal blocks 9 in firm contact with the tubes 5 by screwing into threaded holes 8 in the blocks. The blocks 9 are provided with rounded end portions 10 to fit the tubes 5 and provide extended contact surfaces therewith.

The surfaces of the blocks 9 facing the inside of the furnace are so constructed that slag striking the same will be firmly held in engagement therewith. In the illustrative embodiment of the invention, the blocks 9 are provided with projections that may be in the form of longitudinal wedge-shaped ribs 12, and similarly shaped cross ribs 13 intersecting each other, and leaving rectangularly shaped depressions 14 in the faces of the blocks. When powdered coal is burned in a furnace having walls made up of these blocks, the slag will accumulate in and fill the depressions, and thus build up to a considerable thickness upon the faces of the blocks, and the slag will become anchored in place by the arching or bridging action across the ribs and depressions. In order to cause the slag to begin to build up more readily upon the blocks, the faces of the same containing the ribs and depressions may be first washed with or have a thin coating of plaster upon the same. The ribbed surfaces of the blocks may also be roughened, if desired, by slightly imbedding upon the face of the same when the blocks are being cast and while they are still in a semimolten condition, rough particles of refractory material, such as corundum or the like.

In Fig. 4, the side wall tubes 5 are indicated as being lined with the blocks 9 on the inside to make up the walls of a furnace that is provided with pulverized fuel burners 15 exemplifying a means for burning a slag-forming fuel. The furnace is shown as being located below a boiler, some of the tubes of which are indicated at 16. The tubes 5 may extend into upper and lower headers 17 and 18 and be connected to the circulation system of the boiler in any convenient well known manner, not necessary to show. Excess slag, after the proper thickness has been built up, will trickle down and can be withdrawn from the bottom of the furnace.

In the modification shown in Figs. 5, 6 and 7, parts similar to those shown in Figs. 1, 2 and 3 are shown by the same reference characters with primes. In this modification, the face of the block 9′ is in flat and the depressions 14′ which may be of small depth are located between the rows of ribs 12′ and 13′.

I claim:

1. In combination, a combustion chamber having a wall comprising a row of cooling tubes, a plurality of metallic blocks, means to clamp each of said blocks to said tubes with the inner surface of a block forming part of the inner face of the wall and with each block having extended thermal contact with at least one of said tubes, means to burn slag-forming fuel in the chamber, and projections on said inner surface to cause residue from said burning fuel to adhere thereto.

2. In combination, a combustion chamber having a wall comprising a row of cooling tubes provided with an inner facing formed of metal and in sections, means to clamp each of said sections to said tubes with the inner surface of a section forming part of the inner face of the wall and with each section having extended thermal contact with at least one of said tubes, means to burn slag-forming fuel in the chamber, and projections on said inner surface to cause residue from said burning fuel to adhere thereto.

3. In combination, a combustion chamber having a wall comprising a row of cooling tubes, a plurality of metallic blocks, means to clamp each of said blocks to said tubes with the inner surface of a block forming part of the inner face of the wall and with each block having extended thermal contact with at least one of said tubes, and means to burn slag-forming fuel in the chamber, said surface having a plurality of depressions therein to cause residue from said burning fuel to adhere thereto.

4. In combination, a combustion chamber having a wall comprising a row of cooling tubes, a plurality of metallic blocks, means to clamp each of said blocks to said tubes with the inner surface of a block forming part of the inner face of the wall and with each block having extended thermal contact with at least one of said tubes, means to burn slag-forming fuel in the chamber, and ribs disposed on said inner surface to cause residue from said burning fuel to adhere thereto.

5. In combination, a combustion chamber having a wall comprising a row of cooling tubes, a plurality of metallic blocks, means to clamp each of said blocks to said tubes with the inner surface of a block forming part of the inner face of the wall and with each block having extended thermal contact with at least one of said tubes, means to burn slag-forming fuel in the chamber, and intersecting ribs disposed on said inner surface to cause residue from said burning fuel to adhere thereto.

6. As an article of manufacture, a metallic block adapted to form part of a furnace wall having tubes therein, said block having a back shaped to fit one or more of said tubes and, before use in the furnace, having a face provided with projections, whereby, when said block is secured in place in said wall, said projections will cause residue from fuel burning in said furnace to adhere to said face.

7. As an article of manufacture, a metallic block adapted to form part of a furnace wall having tubes therein, said block having a back shaped to fit one or more of said tubes and, before use in the furnace, having a face provided with depressions, whereby, when said block is secured in place in said wall, said depressions will cause residue from fuel burning in said furnace to adhere to said face.

8. As an article of manufacture, a metallic block adapted to form part of a furnace wall having tubes therein, said block having a back shaped to fit one or more of said tubes and, before use in the furnace, having a face provided with intersecting ribs, whereby, when said block is secured in place in said wall, said intersecting ribs will cause residue from fuel burning in said furnace to adhere to said face.

9. As an article of manufacture, a metallic block adapted to form part of a furnace wall having tubes therein, said block having a back shaped over an extensive area to fit one or more of said tubes and, before use in the furnace, having a face provided with projections, whereby, when said block is secured in place in said wall, said projections will cause residue from fuel burning in said furnace to adhere to said face.

ERVIN G. BAILEY.